United States Patent
Fukuda

[11] Patent Number: 5,851,254
[45] Date of Patent: *Dec. 22, 1998

[54] METHOD FOR MOLDING VITREOUS OPTICAL ELEMENTS

[75] Inventor: Masaaki Fukuda, Omiya, Japan

[73] Assignee: Fuji Photo Optical Co., Ltd., Omiya, Japan

[*] Notice: This patent issued on a continued prosecution application filed under 37 CFR 1.53(d), and is subject to the twenty year patent term provisions of 35 U.S.C. 154(a)(2).

[21] Appl. No.: 921,794

[22] Filed: Sep. 2, 1997

[30] Foreign Application Priority Data

Sep. 3, 1996 [JP] Japan ................... 8-250879

[51] Int. Cl.$^6$ ................... C03B 33/10
[52] U.S. Cl. ............. 65/35; 65/56; 65/70; 65/97; 65/105; 65/112; 65/177; 65/183
[58] Field of Search ............. 65/174, 177, 166, 65/209, 334, 357, 35, 56, 97, 105, 112, 183, 70; 425/289, 531, 553, 806

[56] References Cited

U.S. PATENT DOCUMENTS

| | | | |
|---|---|---|---|
| 196,326 | 10/1877 | Beck | 65/70 |
| 205,781 | 7/1878 | Atterbury | 65/71 |
| 218,010 | 7/1879 | Fox | 65/177 |
| 1,262,567 | 4/1918 | Rippl | 65/35 |
| 1,482,760 | 2/1924 | Milliken | 65/35 |
| 3,729,302 | 4/1973 | Heaton | 65/105 |
| 4,585,152 | 4/1986 | Sager | 225/1 |
| 4,952,354 | 8/1990 | Yokoi et al. | 264/69 |
| 5,069,832 | 12/1991 | Okumura et al. | 264/442 |
| 5,069,833 | 12/1991 | Yokoi et al. | 264/442 |

FOREIGN PATENT DOCUMENTS

| | | |
|---|---|---|
| 996348 | 2/1983 | U.S.S.R. |
| 1416457 | 8/1988 | U.S.S.R. |

Primary Examiner—Stanley S. Silverman
Assistant Examiner—Sean Vincent
Attorney, Agent, or Firm—Oblon, Spivak, McClellan, Maier & Neustadt, P.C.

[57] ABSTRACT

A method for molding optical glass elements including the steps of injecting molten glass material into a mold cavity through an injection port, runner and gate; cooling molten glass material in the mold cavity to a solidified state; and applying vibrations to solidified glass material in the mold cavity through a gate-forming member inserted into the mold assembly to form a gate to make a gate cut by concentration of stresses at boundary regions between the gate and the mold cavity.

5 Claims, 3 Drawing Sheets

METHOD FOR MOLDING VITREOUS OPTICAL ELEMENTS

BACKGROUND OF THE INVENTION

1. Field of the Art

This invention relates to a method for molding vitreous optical elements or components like lenses by injecting heated molten vitreous material into a mold under a predetermined pressure, and more particularly to a method for molding vitreous optical elements, incorporating a method step for cutting off surplus glass from molded optical elements in a smooth and reliable manner subsequent to injection molding.

2. Prior Art

In the production of vitreous optical components like glass lenses, recently the conventional grinding and polishing processes are often substituted by other processes because of involvement of extremely demanding machining operations in addition to difficulties of forming aspheric lenses. For example, in some cases optical lenses are produced by a compression molding process in which a preform of optical glass is placed in a die and, after being softened by heating, it is compressed to shape from opposite sides thereof. The compression molding process is advantageous in that it allows to produce optical components more easily and efficiently as compared with the grinding and polishing process, except for a drawback that the whole manufacturing process involves an increased number of steps due to the necessity for preparing a large number of preforms prior to compression molding operations.

For application to the production of vitreous optical elements, there have also been developed processes employing an injection molding machine thereby to inject molten glass into a mold. In this connection, for example, Japanese Laid-Open Patent Application H1-249630 discloses a process of melting glass material in a crucible and supplying molten glass to an injection nozzle under pressure by means of a plunger or pressurizing feed means. Further, as disclosed in Japanese Laid-Open Patent Application H5-238765, for example, there has been developed a technology of injection molding by the use of a self-consuming type glass of rod-like shape. According to this technology, while heating fore end portions of a glass rod into molten state, the glass rod is pushed forward at its base end to supply molten glass into a mold through an injection nozzle.

No matter whether which type of the above-mentioned injection molding processes is used for the production of vitreous optical elements like lenses, it is necessary to use a mold which defines transfer surfaces of predetermined contour within its cavity, and a gate system for introducing molten glass into the mold cavity, including gate shells which internally define a passage or sprue running from a molten glass injection port to the mold cavity. When molten glass is introduced into the mold cavity, surplus glass material is filled in the sprue in connected state with the glass material which is filled in the mold cavity to make an optical element. Therefore, it inevitably becomes necessary to remove the surplus resin from the molded optical element before or after ejecting the latter from the mold subsequent to a cooling stage. Namely, the surplus glass is cut off at a constricted gate portion at the end of the molten glass passage or sprue, that is to say, at the entrance of the mold cavity by the so-called gate cutting operation. Normally, a gate is cut off from a molded product after ejection from the mold, followed by grinding and polishing to finish the gate-cut portion to stabilized shape.

In this connection, it is also known in the art to integrate the gate cutting into a molding process by the use of a mold which is capable of gate cutting as shown, for example, in Japanese Laid-Open Patent Specifications H6-305745 and H6-305746. Disclosed in Laid-Open Patent Specification H6-305745 is a mold which incorporates a gate-cut system, including a gate-cut pin passage bored in the mold perpendicularly to a sprue and a sharp-edged gate-cut pin which is received in the gate-cut pin passage and retractably protrudable into the sprue. On the other hand, Laid-Open Patent Specification H6-305746 discloses a gate-cut mold assembly consisting of two shell plates and a pair of core molds which are slidable along the shell plates in such a way as to slash off a gate portion at the time of gate cutting.

According to the prior art mentioned above, it is common to the two types of molds, i.e., the gate-cut pin type and the movable core mold type, that a gate portion is cut by a movable component while glass is still in molten state or at least fluidized to a certain degree. This is because, after solidification of glass, it is difficult to make a gate cut by advancing a gate-cut pin toward boundaries between the gate and mold cavity. In the case of the slidable core molds, cracks or chipping may occur to the molded glass in the vicinity of the gate when the core molds are slid after solidification of glass.

In case a mold is arranged to make a gate cut by sliding a mold component or components across a gate while glass is still in a molten or softened state as explained above, there are always possibilities for glass of low viscosity being caught in a gap between fixed and movable components of the mold even if the gap is of an extremely small width. Besides, both of the gate-cut pin type mold and the slidable core type mold have to be retained in a gate-cut position until glass is cooled substantially to solid state. It follows that solidification also occurs to glass which has trapped in sliding portions of the mold, inviting difficulties in extracting a gate-cut pin which has been stuck in the solidified glass and in separating core molds apart from shell plates.

SUMMARY OF THE INVENTION

With the foregoing situations in view, it is an object of the present invention to provide an optical element molding method with step of vibrating which can make a cut through a gate portion smoothly in a secure manner.

It is another object of the present invention to provide an optical element molding method with a step of vibrating which can make a cut through a gate portion securely after complete solidification of vitreous material within a mold cavity, in such a manner as to preclude damages to molded optical elements.

It is still another object of the present invention to provide an optical element molding method which permits easy and facilitated ejection of moldings after gate cutting.

In accordance with the present invention, the above-stated objectives are achieved by the provision of a method for molding vitreous optical elements, which essentially comprises the steps of: injecting molten glass material into a mold cavity through an injection port, runner and gate; cooling molten glass material in the mold cavity to a solidified state; and applying vibrations to solidified glass material in the mold cavity through a gate-forming member inserted into the mold assembly to form a gate to make a gate cut by concentration of stresses at boundary regions between the gate and the mold cavity.

The vibrational gate cutting by the gate-forming member is not carried out until injected molten glass in the mold cavity has been solidified to shape by cooling subsequent to injection molding. Therefore, in case an optical element molding process includes a cooling stage subsequent to a molding stage, the vibration generating means is provided in the cooling stage. If desired, the gate cutting may be carried out afterwards, that is to say, after ejection of the mold from a cooling stage.

The mold set may be either a single cavity type or a multiple cavity type. Even in the case of a multiple cavity type, the mold set is provided with a single injection port which is communicated with the respective cavities through a sprue and a corresponding number of runners. In such a case, the gate-forming member is located in a position which contains the gates to all of the mold cavities and all of or at least part of the runners. The mold set with a cavity or cavities is composed of a plural number of members, for example, upper and lower molds, and an open shaft bored through the upper or lower mold to receive the gate-forming member. A groove or grooves which constitute part of the sprue or runners may be provided on an inner end face of the gate-forming member.

BRIEF DESCRIPTION OF THE DRAWINGS

The above and other objects, features and advantages of the present invention will become apparent from the following description of the invention, taken in conjunction with the accompanying drawings. Needless to say, the accompanying drawings show some preferred embodiments of the invention by way of example and not for any limitative purposes whatsoever, and in which.

DESCRIPTION OF PREFERRED EMBODIMENTS

Hereafter, the invention is described more particularly by way of its preferred embodiments with reference to the accompanying drawings.

Figure 1:
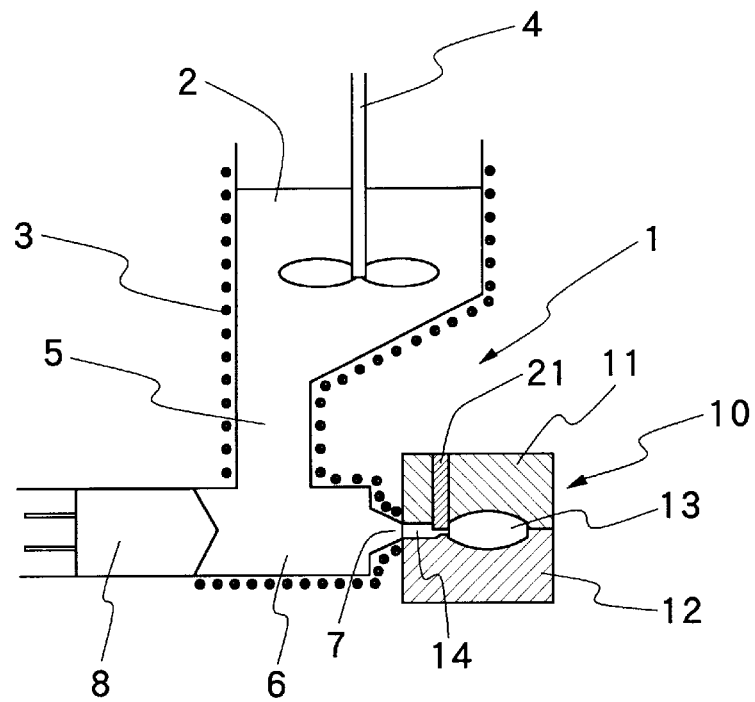
FIG. 1 is a schematic illustration of an optical element molding apparatus adopted as a first embodiment of the present invention.

Shown schematically in FIG. 1 is the general layout of an apparatus for molding an optical lens by injection molding. In this embodiment of the invention, an optical lens is molded by injection of molten glass which is supplied from a glass feeder section 1 to a mold 10.

The glass feeder section 1 includes a crucible 2 which is provided with a heater 3 to maintain glass or vitreous material in the crucible 2 in molten state. The crucible 2 is further provided with a stirrer 4 to keep the temperature of molten glass in the crucible 2 uniform. Through a downflow passage 5, the crucible 2 is communicated with a cylinder 6 which is provided with an injection nozzle 7 at its fore end. The heater 3 is provided around the crucible 2, downflow passage 5 and cylinder 6 including the injection nozzle 7 thereby to control the viscosity of molten glass strictly until the very moment of injection into the mold cavity. Molten glass is introduced into the mold cavity under a predetermined pressure by pushing in a plunger 8 which is slidably fitted in the cylinder 6.

Figure 2:
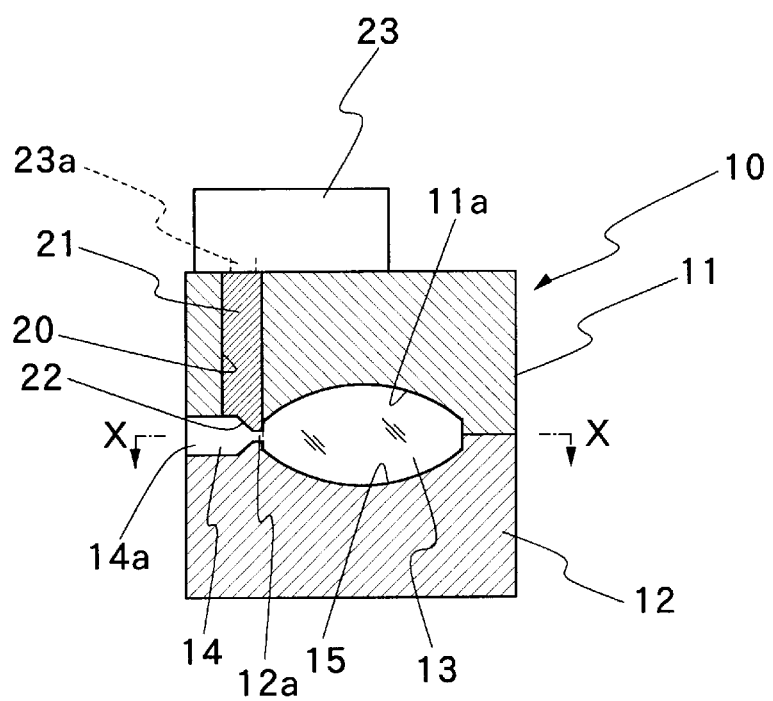
FIG. 2 is a schematic vertical sectional view, showing an example of a mold set for use in the present invention.
Figure 3:
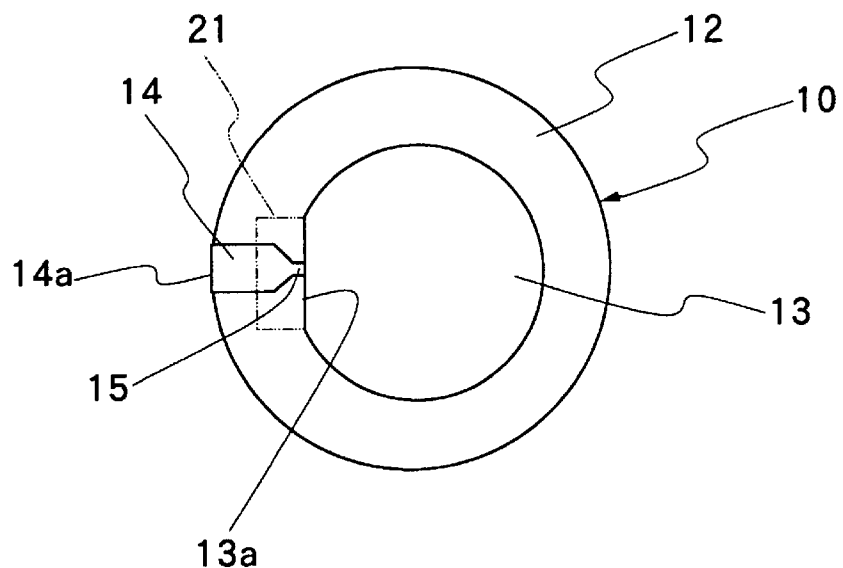
FIG. 3 is a schematic sectional view taken on line X—X of FIG. 2.

As shown in FIGS. 2 and 3, the mold set 10 is comprised of upper and lower molds 11 and 12 which are joined together and clamped in that state by a mold clamper. Formed between the joined faces of the upper and lower molds 11 and 12 is a cavity 13 which defines transfer surfaces 11a and 12a of predetermined curvature or contour to be transferred onto a molded optical element. Namely, the cavity 13 defines the shape of an optical lens to be produced, so that, upon cooling, the molten glass in the mold 10 is solidified to a lens element having surface contours corresponding to the transfer surfaces 11a and 12a of the mold cavity 13. However, as seen in FIG. 3, the circumference of the mold cavity 13 is not a complete circular shape, and partly waned by the provision of a straight D-cut portion 13a. A sprue 14 is formed between the joint faces of the upper and lower molds 11 and 12 to supply molten glass into the mold cavity 13. The outer end of the sprue 14 is opened on one side of the mold 10 to provide a glass injection port 14a, while the other inner end of the sprue 14 is connected to a gate 15 which is opened to the mold cavity 13 through the D-cut portion D.

The injection nozzle 7 is movable into and out of engagement with the glass injection port 14a at the outer end of the sprue 14. After connecting the injection nozzle 7 to the glass injection port 14a, the plunger is driven into the cylinder 6 to inject molten glass into the cavity 13 through the sprue 14 and gate 15. In order to fill the whole mold cavity 13 with molten glass free of bubbling or caviations, the injecting molten glass should have sufficient fluidity for ensuring its smooth flow into the mold 10 and at the same time should be introduced under suitable pressure. In this regard, the viscosity necessary for injection molding means a viscosity at a glass working point, more specifically, a low viscosity in the order of $10^2$ to $10^4$ poise. Subsequent to a cooling stage for solidification of the glass in the mold cavity 13, the molded optical element is ejected by separating the upper and lower molds 11 and 12 apart. In order to expel air smoothly out of the mold at the time of introduction of molten glass, the mold cavity 13 is communicated with a gassing passage although its details in this regard are omitted in the drawings.

As a result of the injection molding as described above, there can be obtained an optical lens having contours copied from the transfer surfaces 11a and 12a of the upper and lower molds 11 and 12. However, in the stage of ejection from the mold 10, surplus glass which has been allowed to solidify within the sprue 14 and gate 15 is still integrally connected to the molded optical lens. Therefore, this surplus glass has to be cut off or detached from the molded product at the gate portion adjoining the mold cavity 13, by the so-called gate cutting operation.

According to the present invention, for gate cutting purposes, a gate-forming member 21 is inserted into a shaft 20 which is bored into the upper mold 11 from the top side thereof. The inner end of the gate-forming member 21, which is disposed face to face with the lower mold 12, is formed with a groove 22. This groove 22 forms part of the sprue 14 including a gate 15 which connects the sprue 14 with the mold cavity 13. In this case, the gate 15 governs the opening to the mold cavity 13. The gate 15 may have a sectional passage area which is equivalent with that of the sprue runner 14, but preferred to have a sectional area which is diminished to some extent for facilitating gate cutting.

Through the gate-forming member 21, which constitutes part of the upper mold 11, vibration is applied to the gate 15 and part of the sprue 14 to separate surplus glass portions from a molded optical element within the mold cavity 13. For this purpose, a vibration generating means 23 is mounted on top of the upper mold 11 of the mold set 10, with a vibrator member 23a in abutting engagement with the gate-forming member 21 to activate the latter with vibration.

Figure 4:
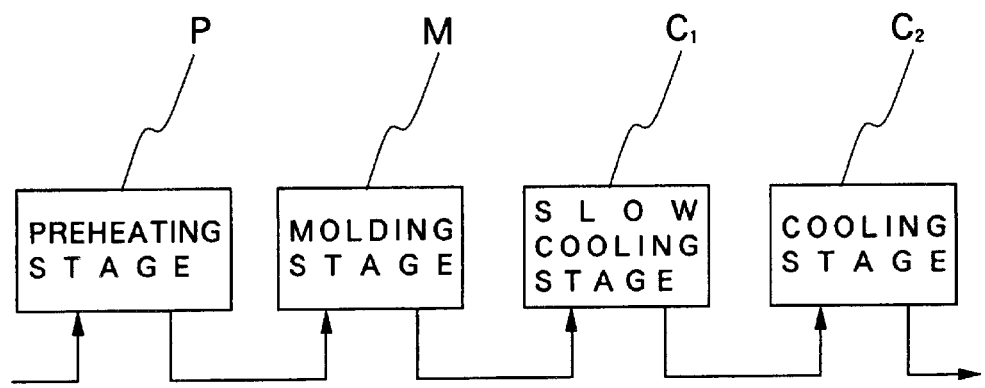
FIG. 4 is a flow chart of a process of molding an optical element with the use of the molding apparatus according to the present invention.

Optical lenses are molded through a number of stages including, as shown in FIG. 4, a preheating stage P, a molding stage M, and two cooling stages, namely, a slow cooling stage $C_1$ and a cooling stage $C_2$. The above-described glass feed section 1 is located in the molding stage M. Of the two cooling stages $C_1$ and $C_2$, the slow cooling stage $C_1$ is for slowly cooling the molten glass in the mold cavity 13 to a solidified state, namely, for bringing the viscosity of the glass from transition point to strain point, more specifically, from $10^{12}$ poise to $10^{14.5}$ poise, while in the second cooling stage $C_2$ the mold 10 is cooled down to an ejection temperature. The vibration generating means 23 is provided in the second cooling stage $C_2$. If desired, the vibration generating means 23 may be provided in the gate-cut stage following the second cooling stage $C_2$.

With a molding apparatus which is arranged as described above, firstly the mold set 10 is brought to and set in the preheating stage prior to introduction of molten glass, to undergo preheating up to a glass working temperature, more specifically, to a temperature region or to a point in the vicinity of a temperature region where the viscosity of glass becomes $10^2$ to $10^4$ poise. After preheating, the mold set 10 is transferred to the molding state M, connecting the injection port 14a, opened on one side of the mold set 10, to the injection nozzle 7. In this state, the plunger 8 is driven into the cylinder 10, whereupon molten glass, maintained in the viscosity of working point within the crucible 2, is introduced into the mold cavity 13 through the injection nozzle 7 and the sprue or runner 14 of the mold assembly 10. In this instance, at the time of connecting the mold set 10 to the injection nozzle 7 of the molten glass feeder section 1, the whole mold set 10 is stably clamped in position by means of a clamp member which is not shown. Therefore, even if molten glass is introduced under pressure, there is no possibility of the gate-forming member 21 being floated up by the pressure of injected molten glass. A heater is provided the clamp member to keep same in heated state.

After injecting molten glass fully into the mold cavity 13, the mold set 10 is transferred from the molding stage M to the slow cooling stage $C_1$ to let the molten glass in the cavity 13 cool off gradually. In order to avoid the problems of fins which might be formed as a result of contraction on solidification of molten glass when cooled quickly, it is desirable to retain the mold in the slow cooling stage $C_1$ until the molten glass in the cavity 13 solidifies into a stabilized shape as an optical lens. After solidification of glass, the mold is further cooled down to an ejection temperature in the second cooling stage $C_2$.

In this instance, the mold set 10 which has been transferred to the second cooling stage $C_2$ is further cooled substantially to a normal temperature or to a temperature in a normal temperature region, and, while the mold set 10 is being cooled, the vibration generating means 23 is abutted against the upper mold 11 of the mold set 10, thereby applying vibration, for example, low frequency vibration of 20 Hz to 30 Hz to the upper mold for a short time duration of 1 second to 3 seconds. Upon application of vibration, concentration of stress occurs to a narrowest molding portion with the smallest sectional area, that is, to the constricted gate portion at the boundaries between the surplus glass portion and the molded optical lens, to such a degree as to finally cause the gate portion to break off. As a result of this vibrational gate cut, surplus glass is removed from the molded optical lens.

In this regard, as the open area of the gate 15 is narrowed, the gate portion which is connected to the lens portion of the molding becomes more fragile and can be readily and accurately cut off from the molded optical element when vibration is applied thereto by the vibration generating means 23. Especially, since the gate 15 is opened into the mold at the straight D-cut portion 13a of the mold cavity 13, a gate cut can be made along a straight line at the gate portion which is thinned down to a different shape as compared with the rest of the molding, leaving substantially a flat and straight cut surface on the molded product.

As described above, it is only after an optical element has been molded to shape by solidification of the molten glass within the mold cavity 13 that vibration is applied to the mold to cut off the gate portion of the molding by concentration of stress, and, during the vibrational gate cutting, the molded optical element is held in a restricted state between the transfer surfaces 11a and 12a of the upper and lower molds 11 and 12. Therefore, it becomes possible to provide a gate-cut surface which is extremely improved in surface accuracy. Besides, the gate-forming member 21 is retained standstill in the preceding stages before complete solidification of the molten glass in the mold 10, so that there is no possibility of the gate-forming member 21 getting locked or stuck in the vertical shaft 20 of the upper mold 11 as a result of intrusion of molten glass into a gap space which may exist between the gate-forming member 21 and the vertical shaft 20.

Figure 5:
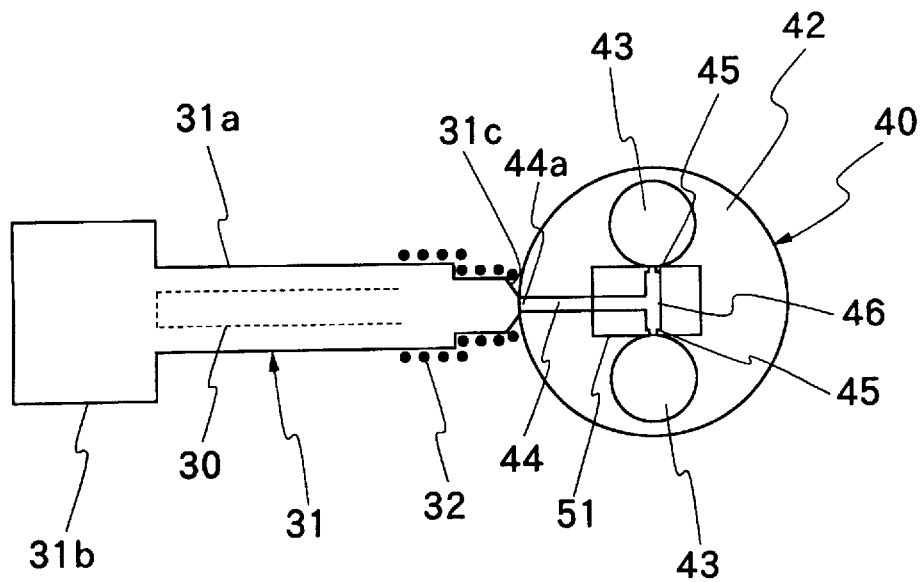
FIG. 5 is a schematic illustration of another embodiment of the optical element molding apparatus according to the present invention.
Figure 6:
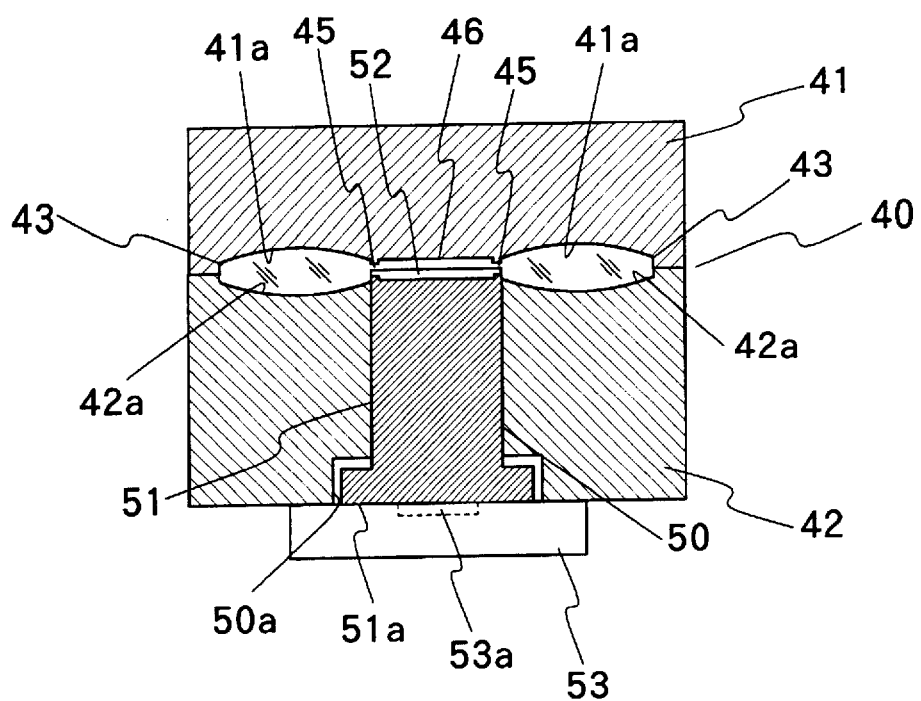
FIG. 6 is a schematic illustration of a gate cutting mechanism.

Referring now to FIGS. 5 and 6, there is shown a second embodiment of the present invention, applied to a molding apparatus which is arranged to supply molten glass to a mold set by melting a glass rod 30 gradually from its fore end portions, instead of heating whole glass material into molten state. Further, employed in this embodiment is a composite or complex type mold set 10 which is capable of molding a plural number of optical lenses at one time. More specifically, the mold set 40 of this particular embodiment is provided with two cavities side by side for molding two optical lenses simultaneously. However, if desired, there may be employed a complex mold set with cavities for three, four or more optical lenses.

As shown in FIG. 5, a glass rod 30 is fitted in a glass feeder unit 31, including a cylinder member 31a which accommodates the glass rod 30, a glass rod impeller 31b which pushes the glass rod 30 forward with fluid pressure or by other suitable means, and an injection nozzle 31c. A heater 32 is provided around fore end portions of the cylinder member 31a and the injection nozzle 31c. In this instance, however, the glass rod 30 is melted down only in its fore end portions and its base end is maintained in solid state.

As seen in FIG. 6, the mold set 40 is largely constituted by upper and lower molds 41 and 42 having cavities 43 on the respective joint faces, each cavity 43 defining transfer surfaces 41a and 42a to be copied onto a molded optical element. Connected to these cavities 43 is a sprue 44 which constitutes a glass feed passage of a predetermined length from a single common glass injection port 44a opened on one side of the mold set 40. The sprue 44 is communicated with gates 45 to the respective cavities 43 through a runner 46.

Provided in the lower mold 42 of the mold set 40 is an open shaft 50 to receive a gate-forming member 51 therein. The gate-forming member 51 is formed with a groove 52 of substantially T-shape. This groove 52 contains part of the sprue 44, the entire length of the runner 46 and the gates 45. The lower end of the shaft 50 is widened into a large-diameter portion 50*a* to receive a flanged portion 51*a* at the lower end of the gate-forming member 51. The lower flanged portion 51*a* of the gate-forming member 51 has a thickness and an outside diameter which are smaller than the width and inside diameter of the lower widened portion 50*a* of the shaft 50, respectively. As a consequence, the flange portions 51*a* of the gate-forming member 51 can be kept out of contact with inner surfaces of the lower widened portion 50*a* of the shaft 50. Located beneath the lower mold 42 is a vibration generating means 53 with a vibrator member 53*a* in abutting engagement with the lower end face of the gate-forming member. It follows that, as soon as the vibration generating means 53 is activated, its vibration is transmitted to the flanged lower end 51*a* of the gate-forming member 51, which is in engagement with the vibrator member 53, putting the flanged lower end 51*a* in vibration within the widened lower end 50*a* of the shaft 50 free of restrictions by inner walls of the lower mold 42.

With the arrangements just described, firstly the heater 32 of the glass feeder unit 31 is turned on to heat and melt down fore end portions of the glass rod 30 into molten state, and then the injection nozzle 31*c* is connected to the glass injection port 44*a* of the sprue 44 of the mold set 40, followed by actuation of the impeller 31*b* to push the glass rod 30 forward. As a result, molten glass is injected into the respective mold cavities 43 from the injection nozzle 31*c* through the runner 46 and gates 45 to mold a couple of optical lenses simultaneously.

Thereafter, the mold set is cooled in a following cooling stage, allowing the injected glass in the respective mold cavities to solidify into the shape of an optical element, and then, in the same manner as explained hereinbefore in connection with the first embodiment, the vibration generating means 53 is activated thereby to apply vibration to the gate-forming member 51 through the vibrator member 53*a* and to cut off surplus glass in the form of a rod of T-shape at the gate portions contiguous to the molded optical elements in the respective mold cavities. Thus, in this instance, a gate cut is made simultaneously on the molded optical elements in the mold cavities 43.

What is claimed is:

1. In a method for molding optical glass elements by the use of a mold assembly including a mold cavity with transfer surfaces in the shape of optical surfaces to be formed on a molded optical element, a molten glass injection port disconnectibly connected to a glass injection nozzle, a sprue communicating said molten glass injection port with said mold cavity through a gate, a movable gate-forming member inserted into said mold assembly to form at least part of said gate, and a vibration generating means for applying vibrations to said gate-forming member, comprising the steps of:

injecting molten glass material into said mold cavity through said injection port and gate;

cooling molten glass material in said mold cavity to a solidified state; and vibrating said solidified glass material in said mold cavity through said gate-forming member to make a gate cut by concentration of stresses at boundary regions between said gate and said mold cavity.

2. A method of molding optical glass elements as defined in claim 1, wherein said step of cooling includes a first slow cooling stage for gradually cooling said molten glass material from a glass working temperature down to a temperature corresponding to a straining point viscosity of said glass material, and a second cooling stage for cooling said glass material to an ejection temperature, said first and second cooling stages being intervened by said step of vibrating.

3. A method for molding optical glass elements as defined in claim 1, wherein said step of vibrating includes applying vibrations from said vibration generating means to said movable gate-forming member for a time period between one and five seconds, inclusive.

4. A method for molding optical glass elements as defined in claim 1, wherein said step of vibrating includes applying vibrations from said vibration generating means to said movable gate-forming member in a frequency range of 20 Hz to 30 Hz.

5. A method for molding optical elements as defined in claim 1, wherein said gate is located in a D-cut position in said mold cavity.

* * * * *